(12) United States Patent
Tin et al.

(10) Patent No.: US 7,404,844 B2
(45) Date of Patent: Jul. 29, 2008

(54) METHOD FOR MAKING CARBON MEMBRANES FOR FLUID SEPARATION

(75) Inventors: Pei Shi Tin, Johor (MY); Tai Shung Neal Chung, Ann Arbor, MI (US)

(73) Assignee: National University of Singapore, Singapore (SG)

( * ) Notice: Subject to any disclaimer, the term of this patent is extended or adjusted under 35 U.S.C. 154(b) by 493 days.

(21) Appl. No.: 11/063,501

(22) Filed: Feb. 23, 2005

(65) Prior Publication Data
US 2005/0235825 A1 Oct. 27, 2005

Related U.S. Application Data

(60) Provisional application No. 60/548,072, filed on Feb. 26, 2004.

(51) Int. Cl.
*B01D 53/22* (2006.01)
*B01D 71/06* (2006.01)

(52) U.S. Cl. .................. 95/45; 95/51; 95/54; 95/55; 96/4; 96/8; 96/10; 96/14; 55/DIG. 5; 264/29.1; 264/29.6; 264/29.7

(58) Field of Classification Search .......... 95/45, 95/47, 51, 52, 54, 55; 96/4, 7, 8, 10, 11, 96/12, 13, 14; 55/DIG. 5; 264/29.1, 29.6, 264/29.7
See application file for complete search history.

(56) References Cited

U.S. PATENT DOCUMENTS

| 4,776,936 A | * | 10/1988 | Smith et al. .................. 96/10 |
| 4,919,860 A | | 4/1990 | Schindler et al. |
| 4,964,887 A | * | 10/1990 | Shimatani et al. .............. 95/51 |
| 6,395,066 B1 | * | 5/2002 | Tanihara et al. ................. 96/8 |
| 6,454,836 B1 | * | 9/2002 | Koelmel et al. ................. 96/7 |
| 6,503,295 B1 | * | 1/2003 | Koros et al. .................... 95/45 |
| 6,565,631 B2 | * | 5/2003 | Koros et al. ..................... 96/8 |
| 6,592,782 B2 | * | 7/2003 | MacKay et al. .................. 96/7 |
| 6,730,364 B2 | * | 5/2004 | Hong et al. .................... 95/45 |
| 6,740,143 B2 | * | 5/2004 | Corbin et al. ............ 55/DIG. 5 |
| 6,921,428 B2 | * | 7/2005 | Yamamoto et al. ............. 95/45 |
| 7,014,681 B2 | * | 3/2006 | Noack et al. ................... 95/45 |

OTHER PUBLICATIONS

J. C. Chen and I. R. Harrison, Modification of polyacrylonitrile (PAN) carbon fiber precursor via post-spinning plasticization and stretching in dimethyl formamide (DMF), Carbon 40, Published by Elsevier Science Ltd., pp. 25-45, 2002.

Wen-Hui Lin and Tai-Shung Chung, The Physical Aging Phenomenon of 6FDA-Durene Polyimide Hollow Fiber Membranes, Journal of Polymer Science: Part B: Polymer Physics, vol. 38, pp. 765-775, 2000.

* cited by examiner

*Primary Examiner*—Jason M Greene
(74) *Attorney, Agent, or Firm*—Stinson Morrison Hecker LLP (57) ABSTRACT

There is disclosed a method of making a high performance carbon membranes from polymer membranes. The method comprising the steps of exposing polymer precursor compounds to a polar organic liquid before pyrolysis of the exposed polymer precursor compounds.

45 Claims, 4 Drawing Sheets

METHOD FOR MAKING CARBON MEMBRANES FOR FLUID SEPARATION

CROSS-REFERENCE TO RELATED APPLICATIONS

This application is based on U.S. Provisional Application Ser. No. 60/548,072, filed on Feb. 26, 2004 which is hereby incorporated by reference in its entirety.

TECHNICAL FIELD

The present invention generally relates to a method of making a polymer membrane such as a carbon membrane for use as a carbon molecular sieve.

BACKGROUND

Fluid separation is an expensive energy consuming process. Industrial separation of gas mixtures of $O_2/N_2$, $CO_2/CH_4$, $H_2/N_2$, and Olefin/Paraffin are particularly expensive and have been commonly undertaken industrially by distillation and pressure sweep processes. An alternative is to use membranes such as a carbon molecular sieve membranes (CMSMs).

CMSMs are highly porous materials distributed with small selective pores. These pores are in the order of 3-6 Å in diameter, making the pores similar in dimension to diffusing gas molecules. The small pore size restricts the rate at which gasses of different size and shape move across the membrane, thereby allowing the CMSMs to exhibit selective adsorption and molecular sieving capabilities for gas mixtures. Accordingly, CMSM can be used to effect size and shape separation between gas molecules of similar molecular dimensions.

CMSMs membranes are usually prepared by pyrolysis of dense polymeric precursors that already show intrinsic gas separation properties. CMSMs exhibit enhanced mass transport properties and separation selectivity of gas mixtures compared to their polymer precursors. Furthermore CMSMs have also been recognized as having higher thermal and chemical stability, making them suitable for use in corrosive, high pressure and high temperature environments.

Studies have reported that a CMSM with tailored microstructure (pore size, pore volume, etc) could be obtained by controlling the pyrolysis conditions and post-/pre-treatment conditions. Thus, attention has been focused on modification of carbon membranes to optimize the separation efficiency. According to reported studies, the current modification technologies performed on carbon membranes include thermo-stabilisation, oxidation, chemical vapor deposition, chemical treatment and physical stretching. One proposal is a first modification method on CMSM by altering pore openings by oxidation and sintering. It was found that the permeability of CMSM increased the oxidized membranes whereas lower permeability was observed for sintered membranes. Other studies have explored a changing the pore dimension of carbon membranes by calcination under mild activation to exhibit excellent selectivity for alkene/alkane separation. On the other hand, other studies have successfully controlled the pore sizes and increased the selectivity of carbon membranes by chemical vapor deposition of propylene.

One study also performed the oxidation on resulting carbon membranes. It was suggested that oxidation has broadened the pore size distribution which resulted in the increment of permeability accompanied by a slight decline in selectivity. In yet another study, oxidation increased the permeances without sacrificing the selectivity of carbon membranes. All above mentioned modifications were carried out on resulting carbonized membranes after pyrolysis, but not on polymer precursors.

One study involved thermal treatment of polymeric hollow fibers in atmospheric air at 400° C. for 30 minutes before pyrolysis. It was found that thermo-stabilisation process strengthened the structure of precursors in order to withstand the high temperatures during pyrolysis.

U.S. Pat. No. 4,919,860 proposed a chemical pretreatment using chemical reagent, where the capillary acrylonitrile membranes were pre-treated in aqueous hydrazine solution before carbonization. It was found that the hydrazine pretreatment improved the dimensional stability of the membrane and at the same time prevented tar formation and clogging of pores during the pyrolysis step.

Another study disclosed in Chen, J. C.; Harrison, I. R. *Modification of polyacrylonitrile (PAN) carbon fiber precursor via post-spinning plasticization and stretching in dimethylformamide (DMF)*, Carbon 2002, 40, 25, modified polyacrylonitrile (PAN) carbon fiber precursors via physical stretching in dimethylformamide (DMF). The post-spinning plasticization and stretching process was shown to remove the surface defects of fiber and attenuate the fiber diameter to promote more uniform heat treatment during pyrolysis.

The above studies have focussed on increasing the strength of the membranes by optimisation of pyrolysis conditions or of the precursors.

There is a need to provide a method for forming membranes with enhanced selectivity in gas separation.

SUMMARY

According to a first aspect of the invention, there is provided a method of making a membrane, the method comprising the steps of:

exposing polymer precursor compounds to a polar organic liquid; and pyrolysing the exposed polymer precursor compounds to form the membrane.

According to a second aspect of the invention, there is provided a method of making a polymer membrane for use in a carbon molecular sieve, the method comprising the steps of:

exposing carbon-containing polymer precursor compounds to a polar organic liquid; and pyrolysing a film of the exposed carbon-containing polymer precursor compounds at a temperature to form a membrane capable of separating gases having different molecular sizes that affect their adsorption and/or diffusion rates.

According to a third aspect of the invention, there is provided a method of making a polymeric membrane for use in a carbon molecular sieve, the method comprising the steps of:

exposing carbon-containing polymer precursor compounds to a polar organic liquid; and pyrolysing the film of the exposed carbon-containing polymer precursor compounds at a temperature to form a carbon membrane capable of separating gases having different sizes.

According to a fourth aspect of the invention, there is provided a method of making a polymeric membrane for use in a carbon molecular sieve, the method comprising the steps of:

exposing carbon-containing polymer precursor compounds to a polar organic liquid; and pyrolysing the film of the exposed carbon-containing polymer precursor compounds at a temperature to form a carbon membrane capable of separating gases having different sizes and adsorption rates.

According to a fifth aspect of the invention, there is provided a membrane made by a method comprising the steps of:
exposing polymer precursor compounds to a polar organic liquid; and
pyrolysing the exposed polymer precursor compounds to form the membrane.

According to a sixth aspect of the invention there is provided a process of separating gases having different molecular sizes comprising:
exposing the gases to the carbon membrane of the fifth aspect so as to separate at least two of the gases.

According to a seventh aspect of the invention, there is provided a carbon molecular sieve membrane made by a method comprising the steps of:
exposing carbon-containing polymer precursor compounds to a polar organic liquid; and
pyrolysing a film of the exposed carbon-containing polymer precursor compounds at a temperature to form a membrane capable of separating gases having different molecular sizes.

According to an eighth aspect of the invention there is provided a process of separating gases having different molecular sizes comprising:
exposing the gases to the membrane of the seventh aspect so as to separate at least two of the gases.

According to a ninth aspect of the invention, there is provided a carbon molecular sieve membrane made by a method comprising the steps of:
exposing carbon-containing polymer precursor compounds to a polar organic liquid; and
pyrolysing a film of the exposed carbon-containing polymer precursor compounds at a temperature to form a carbon membrane capable of separating gases having different adsorption rates.

According to a tenth aspect of the invention there is provided a process of separating gases having different adsorption rates comprising:
exposing the gases to the membrane of the ninth aspect so as to separate at least two of the gases.

The different molecular sizes of the gases may affect their adsorption and diffusion rates.

The gases to be separated may have different molecular sizes.

DEFINITIONS

The following words and terms used herein shall have the meaning indicated:

As used herein, the term 'polymer precursor' means a material which can be polymerized to form a polymer, including, but not limited to, monomers, oligomers, and resins'.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DETAILED DISCLOSURE OF EMBODIMENTS

Exemplary, non-limiting embodiments of a method for pre-treating polymeric membrane precursors for forming carbon membranes will now be disclosed. In one preferred embodiment, the method relates to a method of making a carbon molecular sieve membranes for the separation of fluids, and in particular to separation of mixtures of two or more gasses.

Polar Organic Liquids

The method comprises the step of exposing polymer precursor compounds to a polar organic liquid.

It has surprisingly been found by the inventors that pre-treatment of polymer precursor compounds by exposure to polar organic liquids, prior to pyrolysing, results in a membrane that has enhanced selectivity in separating mixtures of fluids, such as gasses, relative to membranes that have not been exposed to polar organic liquids.

The polar organic liquid may be a low carbon polar organic solvent. The polar organic solvent may have from 1 to 6 carbon atoms, 2 to 6 carbon atoms, 2 to 4 carbon atoms or from 1 to 4 carbon atoms. In one embodiment, the low carbon polar organic solvent is selected from the group consisting of alcohols, ethers, aldehydes, ketones and carboxylic acids, and mixtures thereof.

In one embodiment, the alcohols are selected from the group consisting of methanol, ethanol, propanol, butanol, pentanol and hexanol, and mixtures thereof.

In one embodiment, the ethers are selected from the group consisting of dimethyl ether, ethyl methyl ether, diethyl ether, ethyl propyl ether and dipropyl ether, and mixtures thereof.

In one embodiment, the aldehydes are selected from the group consisting of formaldehyde, acetaldehyde, propanaldehyde, butyraldehyde, iso-butyraldehyde, and mixtures thereof.

In one embodiment, the ketones are selected from the group consisting of acetone, propanone, butanone and iso-butanone, and mixtures thereof.

In one preferred embodiment, the polar organic liquids are pure alcohols such as methanol or ethanol or mixtures thereof. It should be realised that non-polar organic liquids, such as water, may be present during the exposing.

The exposing may be undertaken at a temperature selected from the range group consisting of about 10° C. to about 60° C., 10° C. to about 40° C., about 15° C. to about 35° C., about 20° C. to about 30° C. Advantageously, the exposing can be undertaken under ambient conditions, which means that the method is convenient and easy to implement.

The exposing may be undertaken at a pressure in the range selected from the group consisting of about 50 kPa to 400 kPa, 50 kPa to 300 kPa, 50 kPa to 200 kPa, 80 kPa to 150 kPa, and 95 kPa to 105 kPa.

In one embodiment, the exposing occurs at ambient temperature and pressure. It is a particular advantage of the embodiments, that the exposing may be undertaken at atmospheric temperatures and pressures as this may reduce the costs associated with production of the membrane.

The exposing may be undertaken for a period of time selected from the group consisting of: about 0.1 hours and 80 hours, 0.2 hours and 70 hours, 0.5 hours to about 60 hours; about 0.5 hours to about 48 hours; about 0.5 hours to about 36 hours; about 0.5 hours to about 24 hours; about 0.5 hours to about 12 hours; about 0.5 hours to about 6 hours; about 0.5 hours to about 2 hours; and about 1 hour to about 60 hours; about 1 hours to about 24 hours.

In one embodiment, a dense film of polymer precursor compounds is exposed to the polar organic liquid.

Removing Polar Organic Liquid from the Polymer Precursor Compounds

The method may further comprise the step of removing the polar organic liquid from the polymer precursor compounds. The removing may be undertaken to remove substantially any trace of the polar organic liquid from the surface of polymer precursors.

The removing may comprise removing polar organic liquid from the polymer precursor compounds by one or more of heating, desiccation, evaporation, drying, drying under vacuum, or drying using heated gas.

In one embodiment, the polar organic liquid is completely removed from the polymer precursor compounds by exposing the nascent treated polymer precursor to the atmosphere for about 18 to 48 hours or about 18 to 30 hours to ensure that remaining polar organic liquid is evaporated at ambient temperature and pressure.

The Membrane

The membrane may be in the form of a dense film, tube or hollow fiber.

The polymer forming the membrane permits passage of fluids comprising constituent species of different molecular sizes and shape that diffuse through the membrane at different rates. The polymer forming the membrane permits passage of fluids comprising constituent species of different molecular sizes and shapes that diffuse through the membrane at different rates.

In one embodiment, the fluid may be a gas phase. Advantageously, any gases that differ in size, for example mixtures of nitrogen ($N_2$) and oxygen ($O_2$), or mixtures of ethene ($CH_2CH_2$) and ethane ($CH_3CH_3$), can be separated using the membranes described herein.

The ability of the membrane to separate gasses can result in enrichment of a gas stream. For example, a gaseous mixture containing methane ($CH_4$) and carbon dioxide ($CO_2$) can be enriched in $CH_4$ by a gas-phase process through the membranes described herein. In other embodiments, the membranes are used to purify helium (He), hydrogen (H), hydrogen sulfide ($H_2S$).

In one embodiment, gasses that may be separated by the membranes described herein may be, mixtures of $O_2/N_2$, or $CO_2/CH_4$, or $CO_2/N_2$ gasses.

In one embodiment, the fluid may be a liquid comprising at least two solutes.

The membrane polymer may be a generally rigid, thermostable glassy polymer (having high glass transition temperatures, i.e., temperatures above about 150° C.), although rubbery polymer membranes or flexible glassy polymer membranes can be used.

It is preferred that a rigid, thermostable glassy polymer is used for carbon molecular sieve membranes (CMSMs). Exemplary rigid glassy polymers that may be used for CMSMs include, polycarbonates, cellulosic polymers, polyamides, polyimides poly(amid-imides), polyfurfuryl alcohol (PFA), polyvinylidene chloride (PVDC), phenolic polymers, polyacrylonitrile (PAN), and polyetherimides. The method of making carbon CMSMs as will be described in more detail further below.

Polymer Precursors and Polymer Membrane

An appropriately selected polymer precursor can be used to form membranes which permit passage of the desired gases to be separated. The polymeric membrane permits one or more of the desired gases to permeate through the membrane at different diffusion rates than other components, such that one of the individual gases, for example carbon dioxide, diffuses at a faster rate through the polymer than methane. Advantageously, the rate at which one gas passes through the membrane made from pyrolysed polymer precursors that have been exposed to polar organic liquids is much greater than the rate for a membrane made from precursors that have not been exposed to the polar organic liquid.

In one embodiment, the carbon-containing polymer precursor compounds are selected from the group consisting of polyimides, polyamides and poly(amides-imides).

The polymeric membrane may be a continuous phase polymer. The continuous phase polymer may be selected from the group consisting of substituted and unsubstituted polymers.

Exemplary polymers may be selected from the group consisting of poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenyl-methallyl ethers; and grafts and blends containing any of the foregoing, wherein typical substituents providing substituted polymers include halogens such as fluorine, chlorine and bromine; hydroxyl groups; lower alkyl groups; lower alkoxy groups; monocyclic aryl; lower acyl groups and the like.

The continuous phase polymer may comprise polyimides represented by the following general structure (I):

wherein,

Ar$_1$ is a quadrivalent organic group;

Ar$_2$ is an aromatic diamine moiety; and n is an integer greater than 1 and represents the number of repeating monomer units.

In one embodiment the quadrivalent organic group of Ar$_1$ comprises at least one organic group selected from the group consisting of:

wherein

Z may be independently selected from the group consisting of:

In one embodiment, the aromatic diamine moiety of Ar$_2$ comprises may be selected from the group consisting of:

wherein

Z may be independently selected from the group consisting of:

X, X$_1$, X$_2$ and X$_3$ independently are hydrogen, alkyl groups of 1 to 5 carbon atoms, alkoxy groups of 1 to 5 carbon atoms, phenyl or phenoxy groups.

In one embodiment, the quadrivalent organic group of Ar$_1$ may be hydrocarbon groups including, for example, benzentetrayl group, naphthalentetrayl group, perylentetrayl group, anthracentetrayl group, phenanthrentetrayl group, pyrentetrayl group, biphenyltetrayl group, terphenyltetrayl group, quaterphenyltetrayl group, quinquephenyltetrayl group, diphenylmethantetrayl group, diphenylethantetrayl group, diphenylpropantetrayl group, diphenylbutantetrayl group, diphenylpentantetrayl group, benzophenontetrayl group, diphenylethertetrayl group, diphenylsulfidtetrayl group, diphenylsulfontetrayl group, diphenyldimethylsilantetrayl group, diphenyltetramethyldisiloxantetrayl group, diphenoxybenzentetrayl group, diphenoxybiphenyltetrayl group, bis(phenoxyphenyl)ethertetrayl group, bis(phenoxyphenyl)sulfontetrayl group, bis(phenoxyphenyl)propantetrayl group, anthraquinontetrayl group, phenathrenequinontetrayl group, fluorentetrayl group, fluorenontetrayl group, diphenylfluorentetrayl group, xanthentetrayl group, ethantetrayl group, cyclopentantetrayl group, cyclohexanetetrayl group, and bicyclohexyltetrayl group.

The quadrivalent organic groups may be substituted by characteristic groups. Exemplary characteristic groups include di-substituted amino group (dimethylamino, diethylamino, dibutylamino, ethylmethylamino, butylmethylamino, diamylamino, dibenzylamino, diphenethylamino, diphenylamino, ditolylamino, dixylylamino, methylphenylamino and benzylmethylamino group); mono-substituted amino group (methylamino, ethylamino, propylamino, iso- propylamino, tert-butylamino, anilino, anicisino, phenetidino, toluidino, xylidino, pyridylamino, thiazolylamino, benzylamino and benzylideneamino group); cyclic amino group (pyrrolidino, piperidino, piperazino, morpholino, 1-pyrrolyl, 1-pirazolyl, 1-imidazolyl and 1-triazolyl group); acylamino group (formylamino, acetylamino, benzoylamino, cinnamoylamino, pyridinecarbonylamino and trifluoroacetylamino group); sulfonylamino group (mesylamino, ethylsulfonylamino, phenylsulfonylamino, pyridylsufonylamino, tosylamino, taurylamino, trifluoromethylsulfonylamino, sulfamoylamino, methylsulfamoylamino, sulfanylamino and acetylsulfanylamino group); amino group; hydroxyamino group; ureide group; semicarbazide group; carbazide group; di-substituted hydrazino group (dimethylhydrazino, diphenylhydrazino and methylphenylhydrazino group); mono-substituted hydrazino group (methylhydrazino, phenylhydrazino, pyridylhydrazino and benzylidenehydrazino group); hydrazino group; amidino group; oxime group (hydroxyiminomethyl, methoxyiminomethyl, ethoxyiminomethyl, hydroxyiminoethyl, hydroxyiminopropyl group, etc.); hydroxyl group; oxy group (methoxy, ethoxy, propoxy, butoxy, hydroxyethoxy, phenoxy, naphthoxy, pyridyloxy, thiazolyloxy and acetoxy group); thio group (methylthio, ethylthio, phenylthio, pyridylthio and thiazolylthio group); alkoxyalkyl group (hydroxymethyl, hydroxyethyl and hydroxypropyl group); cyano group; cyanate group; thiocyanate group; nitro group; nitroso group; mercapto group; halogen group (fluoro, chloro, bromo and iodo group); carboxyl group and the salts thereof; oxycarbonyl group (methoxycarbonyl, ethoxycarbonyl, phenoxycarbonyl and pyridyloxycarbonyl group); aminocarbonyl group (carbamoyl, methylcarbamoyl, phenylcarbamoyl, pyridylcarbamoyl, carbazoyl, allophanoyl, oxamoyl and succinamoyl group); thiocarboxyl and the salts thereof; dithiocarboxyl and the salts thereof; thiocarbonyl group (methoxythiocarbonyl, methylthiocarbonyl and methylthiothiocarbonyl group); acyl group (formyl, acetyl, propionyl, acryloyl, benzoyl, cinnamoyl, pyridinecarbonyl, thiazolecarbonyl and trifluoroacetyl group); thioacyl group (thioformyl, thioacetyl, thiobenzoyl and pyridinethiocarbonyl); sulfinic acid radical and the salts thereof; sulfonic acid radical and the salts thereof; sulfinyl group (methylsulfinyl, ethylsulfinyl and phenylsulfinyl group); sulfonyl group (mesyl, ethylsulfonyl, phenylsulfonyl, pyridylsulfonyl, tosyl, tauryl, trifluoromethylsulfonyl, sulfamoyl, methylsulfamoyl, sulfanilyl and acetylsulfanilyl group); oxysulfonyl group (methoxysulfonyl, ethoxysulfonyl, phenoxysulfonyl, acetaminopheoxysulfonyl and pyridyloxysulfonyl group); thiosulfonyl group (methylthiosulfonyl, ethylthiosulfonyl, phenylthiosulfonyl, acetaminophenylthiosulfonyl and pyridylthiosulfonyl group); aminosulfonyl group (sulfamoyl, methylsulfamoyl, dimethylsulfamoyl, ethylsulfamoyl, diethylsulfamoyl, phenylsulfamoyl, acetaminophenylsulfamoyl and pyridylsulfamoyl group); ammonio group (trimethylammonio, ethyldimethylammonio, dimethylphenylammonio, pyridinio and quinolinio group); azo group (phenylazo, pyridylazo and thiazolylazo group); azoxy group; alkyl halide group (chloromethyl, bromomethyl, fluoromethyl, dichloromethyl, dibromomethyl, difluoromethyl, trifluoromethyl, pentafluoroethyl and heptafluoropropyl group); organosilicic group (silyl, disilanyl, trimethylsilyl and triphenylsilyl group).

In one embodiment, the continuous polymer phase comprises polymers represented by the following general formula (II):

The name of the polymer of formula (II) is 3,3'4,4'-benzophenone tetracarboxylic dianhydride and 5(6)-amino-1-(4'-aminophenyl-1,3-trimethylindane) and is commercially available under the trade name MATRIMID™ 5218 (BTDA-DAPI,) from Ciba Polymers of Hawthorne, N.Y., United States of America.

In one embodiment, the continuous polymer phase comprises polymers represented by the following general formula (III):

The polymer of formula (III) is a copolymer of 3,3'4,4'-benzophenone tetracarboxylic dianhydride and 80% methylphenylene-diamine+20% methylene diamine and is commercially available under the trade name P84™ BTDA-TDI/MDI from Lenzing Performance Inc. of Lowland, Tenn., United States of America.

Carbon Molecular Sieve Membranes

The method can be used to make a carbon molecular sieve membrane (CMSM). The CMSM may be derived from the pyrolysis of any suitable polymeric material that may result in an amorphous carbonised structure. Materials consisting of polymeric precursor compounds for pyrolysis can be prepared in any convenient form such as sheets, tubes, and hollow fibers.

Pyrolysis of Polymeric Precursor Compounds in CMSMs

The CMSMs may first be prepared by pyrolysing a polymeric film or other continuous polymeric body.

In one embodiment, a polymeric film is prepared by dispersing dried polymeric precursor powders in solvent to form a polymer solution, casting a film of the polymer solution, and evaporating the solvent to form a polymeric film.

The film can be stacked or formed into tubes or hollow fibers, or other conventional shapes used for gas separations.

Selection of the polymeric material for to CMSM may be made on the basis of the heat resistance, solvent resistance, and mechanical strength of the porous separation membrane, as well as other factors dictated by the operating conditions for selective permeation. Exemplary CMSM particles are those prepared from the pyrolysis of aromatic polyimides or cellulosic polymers. Examples of aromatic polyimides are described in U.S. Pat. No. 4,690,873. Another patent describing useful polymers which can be subjected to pyrolysis is U.S. Pat. No. 4,685,940. The contents of each of these patents are hereby incorporated by reference.

For gas separation, it is advantageous to obtain CMSMs have a pore size and a pore size distribution that effectively separates specific mixtures of fluids. Generally, a pore size distribution may be in the range of about 3 to about 10 Angstroms and about 3 to about 5 Angstroms for gas separations. The sizes of the gases being separated may be in the range of 2 to 6 Angstroms or 2 to 4 Angstroms.

Polymer Precursor Powders and Films in CMSM

A polymeric powder may be used as the starting material for preparing polymer precursor films in CMSM.

A polymeric film can be formed by solution casting a polyimide solution on a flat glass/wafer surface with a variable thickness polymer film applicator. Suitable polyimides can be formed, for example, by reacting suitable dianhydrides with diamines. Suitably, aromatic anhydrides and aromatic diamines are used in condensation reactions to form aromatic polyimides.

In a one embodiment, an aromatic polyimide resin is used to form a flat film. An exemplary aromatic polyimide is Matrimid™. The Matrimid™ 5218 polymer resin is soluble in several solvents such as dichloromethane.

In a one embodiment, an aromatic polyimide resin is used to form a flat film. An exemplary aromatic polyimide is P84™. The P84 polymer resin is soluble in several solvents such as N,N-dimethylformaide (DMF).

Pyrolysis of the Precursor Powder Film in CMSM

In one embodiment, a prepared dense film of the precursor compounds may be pyrolysed.

Pyrolysis can be generally affected in a wide range of temperatures, between the decomposition temperature of the carbonaceous material and the graphitization temperature. Pyrolysis may be effected in the range of selected from group consisting of 500° C. to 1500° C., 500° C. to 1400° C., 600° C. to 1300° C., 600° C. to 1200° C., 700° C. to 1200° C. and 800° C. to 1200° C.

During the pyrolysis process, the heating may be affected under a vacuum or inert gas (e.g., nitrogen, argon) atmosphere. Controlled thermal degradation of the polymer precursor results in a pore opening, and thus pre-determined pore-size ranges can be obtained, suitable for the intended separation process.

The dense film of the precursor compounds may be placed in a suitable furnace and pyrolyzed.

Suitable film thickness ranges are selected from the group consisting of 20 μm to 100 μm; 20 μm to 100 μm; 30 μm to 80 μm; 30 μm to 70 μm; 30 μm to 60 μm; and 30 μm to 50 μm.

The film can be placed on a quartz plate or other similar chemically inert apparatus which can survive the pyrolysis conditions. The quartz plate and films can then be placed in any suitable pyrolysis zone, an example of which is a quartz tube sitting in a Thermcraft™ tube furnace available commercially from Thermcraft Inc of Winston-Salem, N.C., United States of America. In this type of furnace, the tube is substantially centered so that the precursor polymer is within the effective heating zone.

The pyrolysis may occur in an atmosphere filled with an inert gas such as nitrogen or argon. Alternatively, pyrolysis may also be conducted under vacuum conditions wherein the pressure during pyrolysis is in the range selected from the group consisting of between about 1 Pa to about 1600; about 1 Pa to about 1000 Pa; about 1 Pa to about 100 Pa; about 1 Pa to about 10 Pa.

The pyrolysis typically follows a heating cycle. The polymer precursor is carbonized to a specific structural morphology and carbon composition by controlling the heating protocol with three critical variables: temperature set points, rate at which these temperature set points are reached ("ramp"), and the amount of time maintained at these set points ("soak"). The pyrolysis is generally performed to final temperature set points of 600-800° C. or greater with soak times ranging from several minutes to several hours.

The CMSM films may be allowed to cool to ambient room temperature (~25° C.).

EXAMPLES

Non-limiting examples of the invention, including the best mode, and a comparative example will be further described in greater detail by reference to specific Examples, which should not be construed as in any way limiting the scope of the invention.

BRIEF DESCRIPTION OF DRAWINGS

The accompanying drawings illustrate a disclosed embodiments and serve to explain the principles of the disclosed embodiment.

A. Materials and Preparation of Polymer Precursors

Two commercially available polyimides were used as the precursors, Matrimid™ 5218 and P84, to respectively form "Matrimid™ 5218 film" and "P84 film".

Matrimid™ 5218 and P84 polymer powders were dried overnight at 120° C. under vacuum.

2% (w/w) polymer solutions were prepared by dissolving Matrimid™ 5218 in dichloromethane and P84 in DMF.

The two solutions were then been filtered with 1 μm filters (Whatman) and cast onto a wafer plate.

The polymer films were formed after most of the solvent had evaporated slowly.

The casting process for Matrimid™ 5218 film was carried out at room temperature of about 25° C.

The casting process for P84 film was carried out in an oven at 55° C. due to the high boiling point of DMF (153° C.).

The nascent films were dried in vacuum at 250° C. for 48 h to remove the residual solvents.

Membrane films with thickness of about 60 μm were prepared for testing, modification and pyrolysis purposes.

The membrane films were immersed into an alcoholic solution of methanol or ethanol for a period of time under ambient conditions of about 25° C. The exact solution compositions and the time frame of exposure the examples are described below.

The immersed films were then dried naturally at room temperature.

B. Preparation of Carbon Molecular Sieves Membranes (CMSMs)

The Matrimid™ 5218 and the P84 films were subjected to pyrolysis in a Centurion™ Neytech Qex vacuum furnace.

The polymer precursor films were placed on wire meshes and carbonized under vacuum at a pressure of less than about 1600 Pa (<~12 mm Hg).

Pyrolysis was undertaken according to the following protocol:
(i) the polymer films were heated to 250° C. from room temperature of about 25° C. at a rate of 13° C./min;
(ii) the temperature was then raised to 750° C. at a heating rate from 2 to 3.8° C./min; and
(iii) a final temperature of 800° C. was reached at a rate of 0.2° C./min and held for 2 hours.

After completing the heating cycle, membranes were cooled slowly under to a room temperature of about 25° C.

C. Characterization of Carbon Molecular Sieve Membranes

Several characterization instruments were employed to characterize the CMSMs fabricated at different pyrolysis conditions. The elemental analysis was performed with a Perkin-Elmer 2400 Series II CHNS/O Analyzer. The substance was combusted under an oxygen stream in a furnace at temperatures of 950° C. The end product of combustion is mostly the oxides of concerned elements in the form of gases, such as $CO_2$, $H_2O$ and $N_2$. These gases are then separated and carried to a detector using inert gas like helium or argon and the composition was measured as a function of thermal conductivity.

The densities of carbon membrane were measured by a top-loading electronic Mettler Toledo balance coupled with a density kit based on the Archemedes' principle. The samples were first weighed in air and again in a known-density liquid, which was high purity ethanol (99.9%) in this study. The measurement was carried out at room temperature by the buoyancy method and the density was calculated from equation (1) as follows:

$$\rho_{membrane} = \frac{w_o}{w_o - w_1} \rho_{liquid} \quad (1)$$

where $w_0$ and $w_1$ are the membrane weights in air and in ethanol, respectively.

The weight loss of carbon membranes during pyrolysis was characterized by thermogravimetric analysis (TGA) with a TGA 2050 Themogravimetric Analyzer from TA Instruments of New Castle, Del., United States of America. The analysis was carried out with a ramp of 10° C./min at a temperature ranging from 50° C. to 900° C. The purge gas for balance was $N_2$ and its flow rate was controlled at 50 ml/min.

Figure 1:
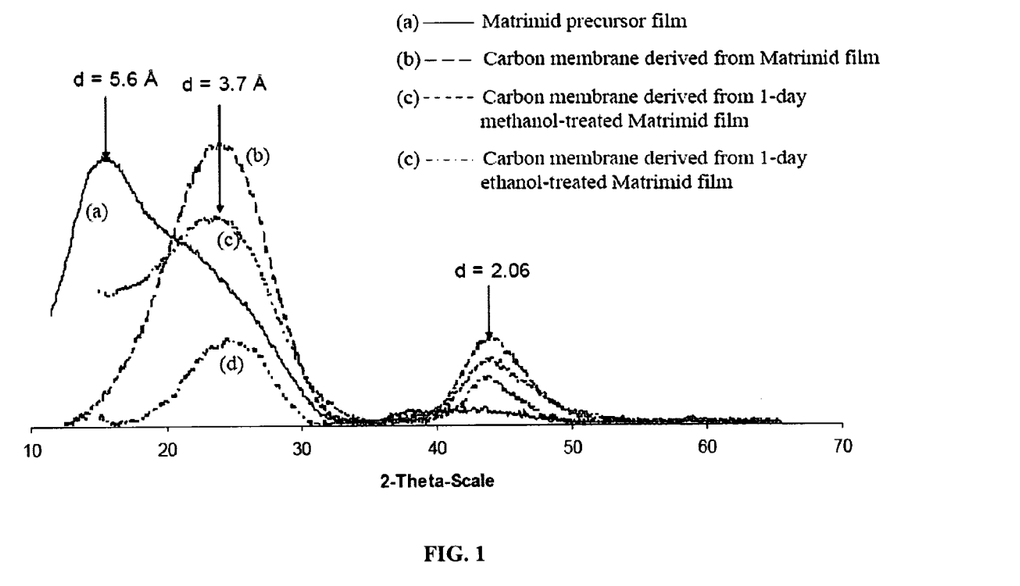
FIG. 1 shows a graph of Wide-angle X-ray diffraction data for Matrimind-derived membranes of examples 2-6.

Wide-angle X-ray diffraction (WAXD) was performed to quantitatively measure the ordered dimensions and interchain spacing of carbon membranes with a Bruker D8 advanced diffractometer from Bruker AXS of Madison, Wis., United States of America, at a room temperature of about 25° C. The data for WAXD Matrimid-derived membranes of examples 2-6 is shown in FIG. 1 and for P84-derived membranes of example 7 in FIG. 2.

The d-spacing values of the WAXD indicate the average spacing of chain center in a polymer matrix. Accordingly, a small piece of sample film was first secured onto a holder. The measurement was completed in a scan range of 2θ=2.5° to 65.4° with a step increment of 0.02°. Ni-filtered Cu Kα radiation with a wavelength of λ=1.5418 Å was used in the experiments. Average d-spacing was determined according to Bragg's law as given in equation (2):

$$n\lambda = 2d \sin \theta \quad (2)$$

where d is the dimension spacing, θ is the diffraction angle, λ is the X-ray wavelength and n is an integral number (1, 2, 3 . . . ).

D. Gas Permeation Measurements

The membranes were tested in pure gas systems. The pure gas permeabilities were determined by a constant volume method. Detailed experimental design and procedures were reported in W. H. Lin, R. H. Vora, T. S. Chung, *Gas Transport Properties of 6FDA-Durene/1,4-phenylenediamine (pPDA) Copolyimides, J. Polym. Phys.* 38 (2000) 2708, the description of which is incorporated herein in its entirety for reference. The permeabilities were obtained in the sequence of $N_2$, $CH_4$, $CO_2$ and $O_2$ at 35° C. and 1.013 MPa (10 atm).

The gas permeability P (in Barrer, 1 Barrer=$1 \times 10^{-10}$ cm$^3$ (STP)-cm/cm$^2$ sec cm Hg) was determined from the rate of pressure increase (dp/dt) obtained when permeation reached steady state. The ideal separation factor of a membrane for gas A to gas B is evaluated according to equation (3):

$$\alpha_{A/B} = \frac{P_A}{P_B} \quad (3)$$

Comparative Example 1

Matrimid™ film-derived CMSMs were prepared as described in section A and B, with the exception that the precursors in this example were not exposed to any alcoholic solvent.

Elemental analysis exemplified that the Matrimid™ film-derived carbon membranes pyrolyzed at 800° C. contained about 85% carbon, 2.0% of hydrogen, 3.0% of nitrogen and 10% of oxygen. The density of the membranes increased after pyrolysis.

The gas permeabilities and ideal selectivities of $O_2$, $N_2$, $CO_2$ and $CH_4$ through CMSMs derived from Matrimid were tested according to section D above and are summarized in Table 1 below.

TABLE 1

Gas separation properties of Matrimid ™ precursor and carbon membranes

| Membrane | Permeability (Barrer) | | | | Selectivity | | |
| --- | --- | --- | --- | --- | --- | --- | --- |
| | $O_2$ | $N_2$ | $CO_2$ | $CH_4$ | $O_2/N_2$ | $CO_2/CH_4$ | $CO_2/N_2$ |
| Matrimind ™ Precursors | 1.68 | 0.25 | 6.5 | 0.19 | 6.6 | 34 | 26 |
| Matrimind ™ film-derived CMSM pyrolysed at 800° C. | 227 | 30.3 | 611 | 10.0 | 7.5 | 61 | 20 |

Pyrolysis was found to have increased the separation capability of the membranes. The gas permeabilities of the Matrimid™ film-derived carbon membranes pyrolyzed at 800° C. increased dramatically after carbonization compared to their polymer precursors. Pyrolysis effectively produced the separation membranes with sufficient selectivity to industrial standards. It can also be seen that selectivities of $O_2/N_2$ and $CO_2/CH_4$ improved after pyrolysis.

Example 2

Matrimid™ dense film (polymeric membrane) was fabricated according to section A above. The polymer film was immersed in pure methanol for 2 hours at room temperature. The dried methanol-treated film was then carbonized through the procedures in section B. The permeation properties of resultant CMSM derived from methanol-treated Matrimid was characterized as described in section D. Table 2 lists the gas permeability and selectivity of CMSM derived from 2-hr methanol-treated Matrimid.

TABLE 2

Gas separation properties of CMSM derived from 2-hr methanol-treated Matrimid

| Membrane | Permeability (Barrer) | | | | Selectivity | | |
| --- | --- | --- | --- | --- | --- | --- | --- |
| | $O_2$ | $N_2$ | $CO_2$ | $CH_4$ | $O_2/N_2$ | $CO_2/CH_4$ | $CO_2/N_2$ |
| CMSM derived from Matrimind ™ film immersed in methanol for 2 hours | 205 | 26.6 | 563 | 7.6 | 7.7 | 74 | 21 |

It can be seen that immersion of the polymer membrane in methanol for 2 hours resulted in carbon membranes with good selectivity values of $O_2/N_2$ and $CO_2/CH_4$.

Example 3

Matrimid™ dense film (polymeric membrane) was fabricated according to section A above. The polymer film was immersed in pure methanol for 6 hours at room temperature. The dried methanol-treated film was then carbonized through the procedures in section B. The permeation properties of resultant CMSM derived from methanol-treated Matrimid™ was characterized as described in section D. Table 3 lists the gas permeability and selectivity of CMSM derived from 6-hr methanol-treated Matrimid™.

TABLE 3

Gas separation properties of CMSM derived from 6-hr methanol-treated Matrimid ™

| Membrane | Permeability (Barrer) | | | | Selectivity | | |
| --- | --- | --- | --- | --- | --- | --- | --- |
| | $O_2$ | $N_2$ | $CO_2$ | $CH_4$ | $O_2/N_2$ | $CO_2/CH_4$ | $CO_2/N_2$ |
| CMSM derived from Matrimind ™ film immersed in methanol for 6 hours | 196 | 22.8 | 501 | 6.4 | 8.6 | 78 | 22 |

It can be seen that immersion of the polymer membrane in methanol for 6 hours resulted in carbon membranes with good selectivity values of $O_2/N_2$ and $CO_2/CH_4$. Furthermore, comparing the results given in Table 3 with those of Table 2, it can be seen that the longer immersion in methanol resulted in a slight decrease in the permeability rate but a higher selectivity across the membrane.

Example 4

Matrimid™ dense film (polymeric membrane) was fabricated according to section A above. The polymer film was immersed in pure methanol for 24 hours at room temperature. The dried methanol-treated film was then carbonized through the procedures in section B. The permeation properties of resultant CMSM derived from methanol-treated Matrimid™ was characterized as described in section D. Table 4 lists the gas permeability and selectivity of CMSM derived from 24-hr methanol-treated Matrimid™.

TABLE 4

Gas separation properties of CMSM derived from 24 hour methanol-treated Matrimid

| Membrane | Permeability (Barrer) | | | | Selectivity | | |
| --- | --- | --- | --- | --- | --- | --- | --- |
| | $O_2$ | $N_2$ | $CO_2$ | $CH_4$ | $O_2/N_2$ | $CO_2/CH_4$ | $CO_2/N_2$ |
| CMSM derived from Matrimind ™ film immersed in methanol for 24 hours | 138 | 15.8 | 423 | 4.8 | 8.8 | 88 | 27 |

It can be seen that immersion of the polymer membrane in methanol for 24 hours resulted in carbon membranes with good selectivity values of $O_2/N_2$ and $CO_2/CH_4$. Furthermore, comparing the results given in Table 4 with those of Table 2 and Table 3, it can be seen that the immersion in methanol for 24 hours resulted in a slight decrease in the permeability rate but a higher selectivity across the membrane compared to immersion for 2 hours and 6 hours.

Example 5

The Matrimid™ dense film (polymeric membrane) fabricated according to section A above was prepared except the polymer film was immersed in pure ethanol for 2 hours at room temperature. The dried ethanol-treated film was then carbonized through the procedures in section B. The permeation properties of resultant CMSM derived from ethanol-treated Matrimid™ was characterized as described in section D. Table 5 lists the gas permeability and selectivity of CMSM derived from 2-hr ethanol-treated Matrimid™.

TABLE 5

Gas separation properties of CMSM derived from 2-hr ethanol-treated Matrimid

| Membrane | Permeability (Barrer) | | | | Selectivity | | |
|---|---|---|---|---|---|---|---|
| | $O_2$ | $N_2$ | $CO_2$ | $CH_4$ | $O_2/N_2$ | $CO_2/CH_4$ | $CO_2/N_2$ |
| CMSM derived from Matrimind ™ film immersed in ethanol for 2 hours | 176 | 18.7 | 480 | 4.7 | 9.4 | 102 | 26 |

The polymer membrane immersed in ethanol for 2 hours resulted in carbon membrane with good selectivity values of $O_2/N_2$ and $CO_2/CH_4$. Comparing the results given in Table 5 with those of Table 2, it can be seen that the immersion in ethanol for resulted in a slight decrease in the permeability rate but a higher selectivity across the membrane compared to immersion for 2 hours in methanol.

Example 6

Matrimid™ dense film (polymeric membrane) was fabricated according to section A above. The polymer film was immersed in pure ethanol for 24 hours at room temperature. The dried ethanol-treated film was then carbonized through the procedures in section B. The permeation properties of resultant CMSM derived from ethanol-treated Matrimid™ was characterized as described in section D. Table 6 lists the gas permeability and selectivity of CMSM derived from 24-hr ethanol-treated Matrimid™.

TABLE 6

Gas separation properties of CMSM derived from 24-hour ethanol-treated Matrimid ™

| Membrane | Permeability (Barrer) | | | | Selectivity | | |
|---|---|---|---|---|---|---|---|
| | $O_2$ | $N_2$ | $CO_2$ | $CH_4$ | $O_2/N_2$ | $CO_2/CH_4$ | $CO_2/N_2$ |
| CMSM derived from Matrimind ™ film immersed in ethanol for 24 hours | 75.4 | 6.3 | 191 | 1.1 | 12 | 169 | 30 |

The polymer membrane immersed in ethanol for 24 hours resulted in carbon membrane with good selectivity values of $O_2/N_2$ and $CO_2/CH_4$. Comparing the results given in Table 6 with those of Table 4, it can be seen that the immersion in ethanol for resulted in a decrease in the permeability rate but a higher selectivity across the membrane compared to immersion for 24 hours in methanol.

Example 7

P84-derived CMSMs were prepared as described in section A and B. Elemental analysis exemplified that the P84™ film-derived carbon membranes pyrolyzed at 800° C. contained about 81% carbon, 2.0% of hydrogen, 6.4% of nitrogen and 12.6% of oxygen.

The gas permeabilities and ideal selectivities of $O_2$, $N_2$, $CO_2$ and $CH_4$ through CMSMs derived from P84 were tested according to section D and summarized in Table 7 below.

TABLE 7

Gas separation properties of P84 precursor and carbon membranes

| Membrane | Permeability (Barrer) | | | | Selectivity | | |
|---|---|---|---|---|---|---|---|
| | $O_2$ | $N_2$ | $CO_2$ | $CH_4$ | $O_2/N_2$ | $CO_2/CH_4$ | $CO_2/N_2$ |
| P84 Precursors | 0.38 | 0.05 | 1.2 | 0.02 | 8.3 | 50 | 26 |
| P84 film-derived CMSM pyrolysed at 800° C. | 158 | 17.8 | 499 | 5.6 | 8.9 | 89 | 28 |

Pyrolysis was found to have increased the separation capability of the membranes. The gas permeabilities of the P84™ film-derived carbon membranes pyrolyzed at 800° C. increased dramatically after carbonization compared to their polymer precursors. Pyrolysis effectively produced the separation membranes with sufficient selectivity to industrial standards.

Simultaneously, the selectivities of $O_2/N_2$ and $CO_2/CH_4$ improved after pyrolysis.

Example 8

P84 dense film (polymeric membrane) was fabricated according to section A above. The polymer film was immersed in pure methanol for 24 hours at room temperature. The dried methanol-treated film was then carbonized through the procedures in section B. The permeation properties of resultant CMSM derived from methanol-treated P84 was characterized as described in section D. Table 8 lists the gas permeability and selectivity of CMSM derived from 24-hr methanol-treated P84.

TABLE 8

Gas separation properties of CMSM derived from 1-day methanol-treated P84

| Membrane | Permeability (Barrer) | | | | Selectivity | | |
|---|---|---|---|---|---|---|---|
| | $O_2$ | $N_2$ | $CO_2$ | $CH_4$ | $O_2/N_2$ | $CO_2/CH_4$ | $CO_2/N_2$ |
| CMSM derived from P84 ™ film immersed in methanol for 24 hours | 132 | 13.6 | 402 | 3.7 | 9.7 | 109 | 30 |

It can be seen that immersion of the polymer membrane in methanol for 24 hours resulted in carbon membrane with good selectivity values of $O_2/N_2$ and $CO_2/CH_4$.

Example 9

P84 dense film (polymeric membrane) was fabricated according to section A above. The polymer film was immersed in pure ethanol for 24 hours at room temperature. The dried ethanol-treated film was then carbonized through the procedures in section B. The permeation properties of resultant CMSM derived from ethanol-treated P84 was characterized as described in section D. Table 8 lists the gas permeability and selectivity of CMSM derived from 24-hr ethanol-treated P84.

TABLE 9

Gas separation properties of CMSM derived from 1-day ethanol-treated P84

| Membrane | Permeability (Barrer) | | | | Selectivity | | |
| --- | --- | --- | --- | --- | --- | --- | --- |
|  | $O_2$ | $N_2$ | $CO_2$ | $CH_4$ | $O_2/N_2$ | $CO_2/CH_4$ | $CO_2/N_2$ |
| CMSM derived from P84 ™ film immersed in ethanol for 24 hours | 101 | 9 | 278 | 2.0 | 11.2 | 139 | 31 |

It can be seen that immersion of the polymer membrane in ethanol for 24 hours resulted in carbon membrane with good selectivity values of $O_2/N_2$ and $CO_2/CH_4$.

Discussion of Experimental Results

Referring to FIG. 1, there is shown a graph of the d-spacing value of Matrimid™ 5218-derived CMSMs, determined from the diffraction peak angles. Line (a) shows diffraction peak angles for Matrimind precursor film (b) shows diffraction peak angles for the Matrimind derived film of comparative of example 1; line (c) shows Matrimind derived films that have been treated with methanol liquid for 1 day and (example 4); and line (d) shows Matrimind derived films that have been treated with ethanol liquid for 1 day (example 6).

It can be seen from FIG. 1, that for amorphous polymer precursors, Matrimid possessed d-spacing value at 5.6 Å. The d-spacing peak of Matrimid shifted to 3.7 Å, which is approximate to the size of penetrants used in this example (nitrogen, oxygen, methane and carbon dioxide) after pyrolyzed at 800° C.

Figure 2:
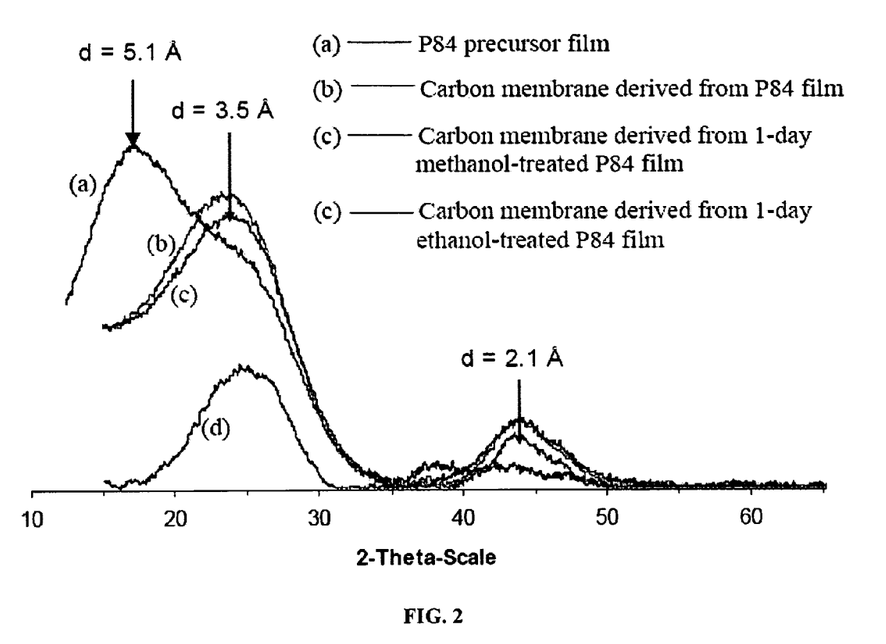
FIG. 2 shows a graph of Wide-angle X-ray diffraction data for P84-derived membranes of example 7.

Referring to FIG. 2, there is shown a graph of the d-spacing value of P84-derived CMSMs, determined from the diffraction peak angles. Line (a) shows diffraction peak angles for P84 precursor film (b) shows diffraction peak angles for the P84 derived film of comparative of example 1; line (c) shows P84 derived films that have been treated with methanol liquid for 1 day and (example 8); and line (d) shows P84 derived films that have been treated with ethanol liquid for 1 day (example 9).

It can be seen from FIG. 2, that for amorphous polymer precursors, P84 possessed d-spacing value at 5.1 Å. The d-spacing peak of P84 shifted to 3.5 Å, which is approximate to the size of penetrants used in this study (nitrogen, oxygen, methane and carbon dioxide) after pyrolyzed at 800° C.

The density of the membranes increased after pyrolysis.

Figure 3:
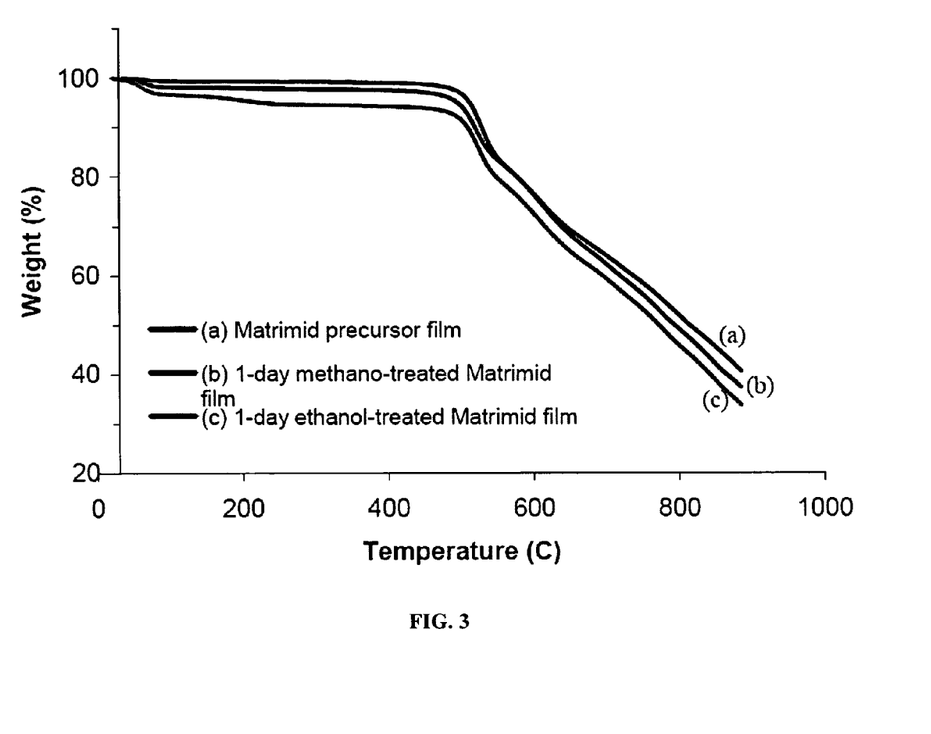
FIG. 3 is a graph showing the thermal degradation of comparative example 1 and examples 2-6 Matrimind films analyzed by TGA.

FIG. 3 shows polymer degradation data was obtained by TGA curve: line (a) shows polymer degradation data for Matrimind precursor films, line (b) shows Matrimind derived films that have been treated with an methanol liquid for 1 day (example 4); and line (c) shows Matrimind derived films that have been treated with ethanol liquid for 1 day (example 6). The Matrimind precursors started to decompose at around 500° C. to 550° C., and then the weight loss increased abruptly with further increases in temperature. The total weight loss at 800° C. was approximately 50% during pyrolysis.

Figure 4:
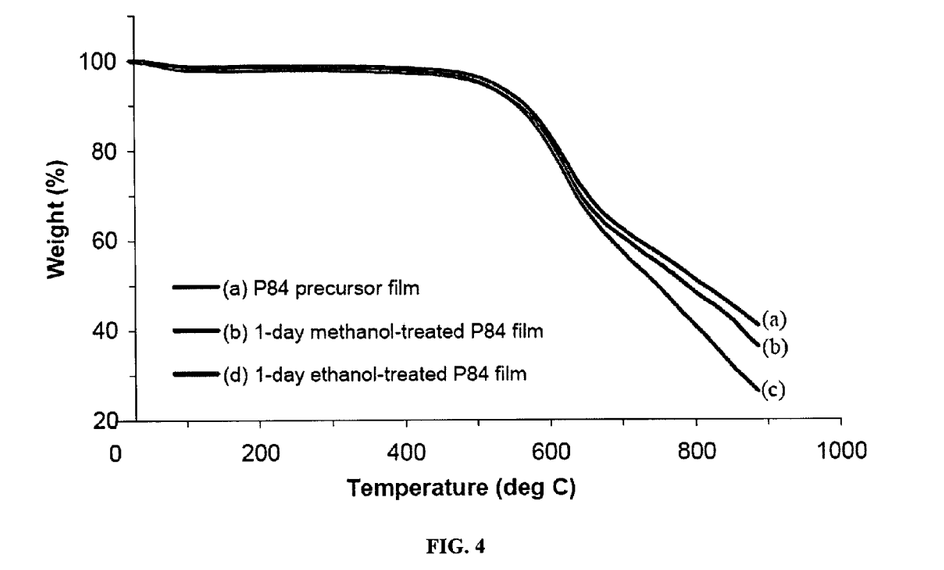
FIG. 4 is a graph showing the thermal degradation of example 7 P84 films analyzed by TGA.

Polymer degradation was obtained by TGA curve as shown in FIG. 4. Line (a) shows polymer degradation for P84 derived films that have not been treated with an alcoholic liquid, line (b) shows P84 derived films that have been treated with an methanol liquid for 1 day and line (c) shows P84 derived films that have been treated with ethanol liquid for 1 day. The P84 precursors started decomposed at around 500° C. to 550° C., and then the weight loss increased abruptly with further increase in temperature. The total weight loss at 800° C. was approximately 50% during pyrolysis. The d-spacing value of P84-derived CMSMs was determined from the diffraction peak angles.

Applications

As can been seen by closely studying the selectivity data in Table 1 of selectivity of the carbon membrane of comparative example 1, it has surprisingly been found that the selectivity's of Examples 2-9 were remarkably enhanced. Accordingly, the selectivity data shows that precursors exposed to a polar organic liquid results in CMSMs with enhanced selectivity towards gas mixtures.

The selectivity enhancement was best observed for the gas pair of $CO_2$ and $CH_4$ due to the large difference in their molecular sizes. The permeabilities, however, decreased after modification in methanol (Examples 2-4) and that in compared to ethanol (Examples 5 and 6). For Matrimid-film derived CMSMs, the high selectivities were achieved for membranes that were exposed for 24 hours. Similarly, for the P84-derived CMSMs, the highest selectivities were also obtained for membranes that were exposed for 24 hours in ethanol.

Moreover, carbon membrane prepared from alcohol-treated precursors exhibited higher density than original carbon membranes. Therefore, without being bound by theory, it would appear that the structure of carbon membranes obtained from alcohol-treated precursors was denser and more orderly packed.

In comparing these findings, it underlines the importance of modification technology reporting in this invention, where alcohol treatment emerged as an effectual modification method in producing CMSMs with excellent separation capability.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

We claim:

1. A method of making a selectively permeable membrane, the method comprising the steps of:
    casting a solution comprising a solvent and polymer precursor compounds to form a dense polymer film;
    evaporating the solvent from said solution of polymer precursor compounds so that the dense polymer film is substantially absent of solvent;
    exposing the dense polymer film substantially absent of solvent to a polar organic liquid; and
    pyrolyzing the exposed dense polymer film to form the selectively permeable membrane, wherein said pyrolyzing and said exposing steps are undertaken under selected conditions such that the membrane selectivity is enhanced relative to a membrane that has not been exposed to said polar organic liquid under said selected conditions.

2. A method as claimed in claim 1, wherein the casting comprises using carbon-containing polymer precursor compounds.

3. A method as claimed in claim 1, comprising selecting the polymer precursor compounds from the group consisting of polycarbonate precursors, cellulosic polymer precursors, polyamide precursors, polyimide precursors, poly(amid-imides) precursors, polyfurfuryl alcohol precursors, polyvinylidene chloride precursors, phenolic polymer precursors, polyacrylonitrile precursors, polyetherimides precursors, and mixtures thereof.

4. A method as claimed in claim 1, wherein the polar organic liquid has from 1 to 6 carbon atoms.

5. A method as claimed in claim 1, comprising selecting the polar organic liquid from the group consisting of alcohols, ethers, aldehydes, ketones, carboxylic acids, and mixtures thereof.

6. A method as claimed in claim 5, comprising selecting the alcohols from the group consisting of methanol, ethanol, propanol, butanol, pentanol and hexanol, and mixtures thereof.

7. A method as claimed in claim 1, comprising undertaking the exposing at a temperature in the range of about 10° C. to about 60° C.

8. A method as claimed in claim 1, comprising undertaking the exposing at a pressure in the range of about 50 kPa to about 400 kPa.

9. A method as claimed in claim 1, comprising undertaking the exposing for a time in the range of about 0.1 hours to about 80 hours.

10. A method as claimed in claim 1, further comprising removing the polar organic liquid from the treated polymer precursor films.

11. A method as claimed in claim 10, wherein the removing comprises any one or more of the following steps: heating, desiccating, evaporating, drying, drying under vacuum, and drying using heated gas.

12. A method as claimed in claim 1, further comprising forming the membrane as a dense film, tube or hollow fiber.

13. A method as claimed in claim 1, wherein the membrane is comprised of a polyimide represented by the following general structure:

(I)

wherein,
Ar$_1$ is a quadrivalent organic group;
Ar$_2$ is an aromatic diamine moiety; and
n is an integer greater than 1 and represents the number of repeating monomer units.

14. A method as claimed in claim 13, wherein the Ar$_1$ is selected from the group consisting of:

wherein
Z is independently selected from the group consisting of:

15. A method as claimed in claim 13, wherein the Ar$_2$ is selected from the group consisting of:

wherein X, $X_1$, $X_2$ and $X_3$ are independently are hydrogen, alkyl groups of 1 to 5 carbon atoms, alkoxy groups of 1 to 5 carbon atoms, phenyl or phenoxy groups and Z is independently selected from the group consisting of:

16. A method as claimed in claim 1, comprising undertaking the pyrolysing at a temperature in the range of about 500° C. to about 1500° C.

17. A method as claimed in claim 1, comprising undertaking the pyrolysing under a vacuum or in the presence of inert gas.

18. A method as claimed in claim 1, wherein the pyrolysing comprises heating a dense film of polymer precursors film, wherein the dense film has a thickness in the range of 20 μm to 100 μm.

19. A method as claimed in claim 1, comprising undertaking the pyrolysing at a pressure during pyrolysis is in the range of between about 1 Pa to about 1600 Pa.

20. A polymer membrane made by a method as claimed in claim 1.

21. A carbon molecular sieve membrane made by a method comprising the steps of:
    casting a solution comprising a solvent and carbon containing polymer precursor compounds to form a dense polymer film;
    evaporating the solvent from said solution of carbon containing polymer precursor compounds, so that the dense polymer film is substantially absent of solvent;
    exposing the dense polymer film substantially absent of solvent to a polar organic liquid; and
    pyrolyzing the exposed dense polymer film to form the carbon molecular sieve membrane capable of separating gases having different molecular sizes, wherein said pyrolyzing and said exposing steps are undertaken under selected conditions such that the membrane selectivity is enhanced relative to a membrane that has not been exposed to said polar organic liquid under said selected conditions.

22. A process of separating gases having different molecular sizes comprising exposing the gases to the polymer membrane of claim 20 so as to separate at least two of the gases.

23. A process of separating gases having different molecular sizes comprising exposing the gases to the carbon molecular sieve membrane of claim 20 so as to separate at least two of the gases.

24. A method of making a polymeric membrane for use in a carbon molecular sieve, the method comprising the steps of:
    casting a solution of polymer precursor compounds to form a dense polymer film;
    evaporating the solvent from said solution of polymer precursor compounds, so that the dense polymer film is substantially absent of solvent;
    exposing the dense polymer film substantially absent of solvent to a polar organic liquid; and
    pyrolyzing the exposed dense polymer film to form the selectively permeable membrane capable of separating gases having different molecular sizes, wherein said pyrolyzing and said exposing steps are undertaken under selected conditions such that the membrane selectivity is enhanced relative to a membrane that has not been exposed to said polar organic liquid under said selected conditions.

25. A method as claimed in claim 24, wherein the casting comprises using carbon-containing polymer precursor compounds.

26. A method as claimed in claim 25, comprising selecting the polymer precursor compounds from the group consisting of polycarbonate precursors, cellulosic polymer precursors, polyamide precursors, polyimide precursors, poly(amid-imides) precursors, polyfurfuryl alcohol precursors, polyvinylidene chloride precursors, phenolic polymer precursors, polyacrylonitrile precursors, polyetherimides precursors, and mixtures thereof.

27. A method as claimed in claim 24, wherein the polar organic solvent has from 1 to 6 carbon atoms.

28. A method as claimed in claim 24, comprising selecting the polar organic solvent from the group consisting of alcohols, ethers, aldehydes, ketones, carboxylic acids, and mixtures thereof.

29. A method as claimed in claim 28, comprising selecting the alcohols from the group consisting of methanol, ethanol, propanol, butanol, pentanol and hexanol, and mixtures thereof.

30. A method as claimed in claim 24 comprising undertaking the exposing at a temperature in the range of about 10° C. to about 60° C.

31. A method as claimed in claim 24 comprising undertaking the exposing at a pressure in the range of about 50 kPa to about 400 kPa.

32. A method as claimed in claim 24, comprising undertaking the exposing for a time in the range of about 0.1 hours to about 80 hours.

33. A method as claimed in claim 24, wherein the exposing comprises providing the polymer precursor compounds as a dense film.

34. A method as claimed in claim 24, further comprising removing the polar organic liquid from the treated polymer precursor compounds.

35. A method as claimed in claim 34, wherein the removing comprises any one or more of the following steps: heating, desiccating, evaporating, drying, drying under vacuum, and drying using heated gas.

36. A method as claimed in claim 24, further comprising forming the membrane as a dense film, tube or hollow fiber.

37. A method as claimed in claim 24 wherein the membrane is comprised of a polyimide represented by the following general structure (I):

wherein, $Ar_1$ is a quadrivalent organic group;

$Ar_2$ is an aromatic diamine moiety; and n is an integer greater than 1 and represents the number of repeating monomer units.

38. A method as claimed in claim 37 wherein the $Ar_1$ is selected from the group consisting of:

wherein
Z is independently selected from the group consisting of:

39. A method as claimed in claim 37, wherein the $Ar_2$ is selected from the group consisting of:

wherein X, $X_1$, $X_2$ and $X_3$ are independently are hydrogen, alkyl groups of 1 to 5 carbon atoms, alkoxy groups of 1 to 5 carbon atoms, phenyl or phenoxy groups and Z is independently selected from the group consisting of:

40. A method as claimed in claim 24 comprising undertaking the pyrolysing at a temperature in the range of consisting of about 500° C. to about 1500° C.

41. A method as claimed in claim 24 comprising undertaking the pyrolysing under a vacuum or in the presence of inert gas.

42. A method as claimed in claim 24 wherein the pyrolysing comprises heating a dense film of polymer precursors film, wherein the dense film has a thickness in the range consisting of 20 µm to 100 µm.

43. A method as claimed in claim 24 comprising undertaking the pyrolysing at a pressure during pyrolysis is in the range of between about 1 Pa to about 1600 Pa.

44. A polymer membrane made by a method as claimed in claim 24.

45. A method of making a membrane, the method comprising the steps of:
 exposing polymer precursor compounds to a polar organic liquid; and
 pyrolysing the exposed polymer precursor compounds to form the membrane,
 wherein the membrane is comprised of a polyimide represented by the following general structure (I):

wherein,
$Ar_1$ is a quadrivalent organic group;
$Ar_2$ is an aromatic diamine moiety; and
n is an integer greater than 1 and represents the number of repeating monomer units.

* * * * *